United States Patent
Hjartarson et al.

(10) Patent No.: US 10,673,532 B2
(45) Date of Patent: *Jun. 2, 2020

(54) ELECTRO-ABSORPTION MODULATOR WITH INTEGRATED CONTROL LOOP FOR LINEARIZATION AND TEMPERATURE COMPENSATION

(71) Applicant: ElectroPhotonic-IC Inc., Kanata (CA)

(72) Inventors: Gudmundur A. Hjartarson, Ottawa (CA); William A. Hagley, Ottawa (CA)

(73) Assignee: ElectroPhotonic-IC Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,887

(22) Filed: Dec. 10, 2019

(65) Prior Publication Data

US 2020/0116932 A1  Apr. 16, 2020

Related U.S. Application Data

(63) Continuation-in-part of application No. 16/263,169, filed on Jan. 31, 2019, now Pat. No. 10,530,484.
(Continued)

(51) Int. Cl.
*H04B 10/50* (2013.01)
*G02B 6/122* (2006.01)
(Continued)

(52) U.S. Cl.
CPC ..... *H04B 10/50593* (2013.01); *G02B 6/1225* (2013.01); *H04B 10/50575* (2013.01); *H04B 10/588* (2013.01); *G02B 2006/12135* (2013.01)

(58) Field of Classification Search
None
See application file for complete search history.

(56) References Cited

U.S. PATENT DOCUMENTS 6,687,466 B1   2/2004  Chiappetta
6,844,954 B2   1/2005  Bond et al.
(Continued)

FOREIGN PATENT DOCUMENTS

EP   0600533 A1   6/1994

OTHER PUBLICATIONS

Johan Bauwelinck et. al., Book Chapter 10: "Electronic drivers/TIAs for optical interconnects"; Book title "Optical interconnects for data centers", p. 247-262, Ed. T. Tekin et al., Elsevier Nov. 14, 2016.

*Primary Examiner* — Casey L Kretzer
(74) *Attorney, Agent, or Firm* — Miltons IP/p.i.

(57) ABSTRACT

An electro-absorption modulator (EAM) comprising an integrated high speed electro-optical control loop for very high-speed linearization and temperature compensation for analog optical data center interconnect applications is disclosed. The control loop can function in a stable manner because the electronics and optical components are monolithically integrated on a single substrate in small form factor. Because of the small size enabled by monolithic integration, the temperatures of the optical blocks and electronics blocks are tightly coupled, and the control loop time delays and phase delays are small enough to be stable, even for very high frequency operation. This arrangement enables a low cost, low power analog transmitter implementation for data center optical interconnect applications using advanced modulation schemes, such as PAM-4 and DP-QPSK.

21 Claims, 5 Drawing Sheets

Related U.S. Application Data

(60) Provisional application No. 62/625,311, filed on Feb. 1, 2018, provisional application No. 62/936,629, filed on Nov. 18, 2019.

(51) Int. Cl.
  *H04B 10/588*   (2013.01)
  *G02B 6/12*   (2006.01)

(56) References Cited

U.S. PATENT DOCUMENTS

| | | |
|---|---|---|
| 6,873,801 B1 | 3/2005 | Yamaki et al. |
| 7,340,184 B2 | 3/2008 | Frederiksen et al. |
| 8,269,431 B2 | 9/2012 | Then et al. |
| 2004/0028099 A1 | 2/2004 | Hongo et al. |
| 2009/0324252 A1 | 12/2009 | Nagayama et al. |
| 2013/0084065 A1 | 4/2013 | Ishii |

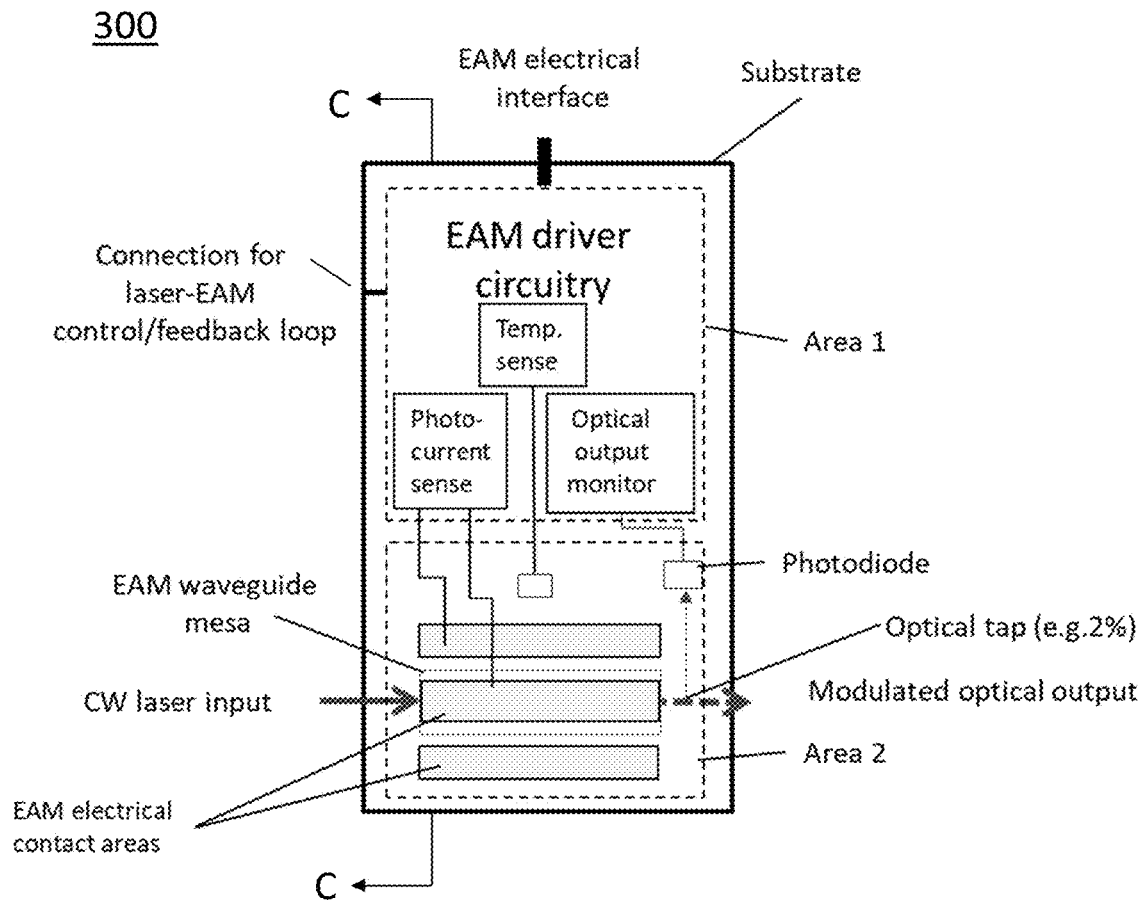
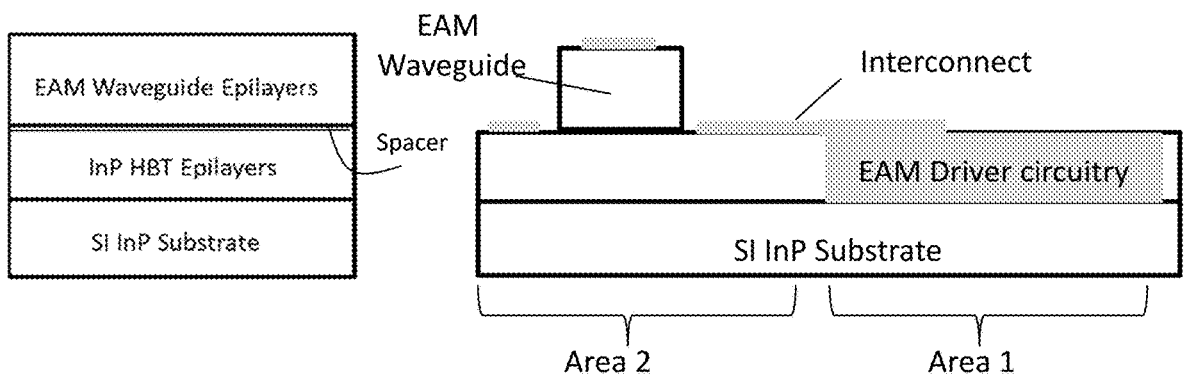
Fig. 3A
Fig. 3B
Fig. 3C

ELECTRO-ABSORPTION MODULATOR WITH INTEGRATED CONTROL LOOP FOR LINEARIZATION AND TEMPERATURE COMPENSATION

CROSS-REFERENCE TO RELATED APPLICATIONS

This application is a continuation-in-part of U.S. patent application Ser. No. 16/263,169, filed Jan. 31, 2019, entitled "Integrated Control Loop for Linearization and Temperature Compensation of an Electro-Absorption Modulator", which claims priority from U.S. provisional patent application No. 62/625,311, filed Feb. 1, 2018, entitled "Integrated Control Loop for Linearization and Temperature Compensation of an Electro-Absorption Modulator", and this application claims priority from U.S. provisional patent application No. 62/936,629, filed Nov. 18, 2019, entitled "Vertically Integrated Electro-Absorption Modulated Lasers and Methods Of Fabrication"; all of these applications are incorporated herein by reference in their entirety.

TECHNICAL FIELD

The present invention relates to electro-absorption modulators and particularly to linearization and temperature compensation of electro-absorption modulators for high-speed optical data center applications.

BACKGROUND

Electro-absorption modulators (EAM) are commonly used in the fiber optics world. EAMs are used as external modulators of light output from continuous wave lasers. For example, an EAM can be used with an inexpensive slow laser for a high-performance application, i.e. transmitting at data rates limited, not by the characteristics of the laser, but by the characteristics of the EAM.

In most applications of EAMs to date, the modulators and the electronics driving the modulator are separate chips mounted on a substrate and interconnected by a matched impedance strip-line circuit. At the speeds where EAMs are typically used, a matched impedance drive circuit is required, unless the interconnect length is much less than a wavelength. Commonly available packaging approaches do not meet this requirement and matched impedance interconnect is needed. However, use of a matched impedance strip-lines results in significant power loss, i.e. loss of half of the drive voltage due to the matched impedances. For a typical EAM drive voltage is in the order of 2 Volts, and an impedance of 50 Ohms, the drive power is quite high, because of the low impedance. To reduce power loss and improved performance, there is a need for alternative solutions that eliminate the need for matched impedance strip-lines.

Another issue is that EAMs are non-linear, temperature dependent and wavelength dependent. As such, they are normally used in applications where the modulation of the light is simple on-off modulation. Analog modulation schemes for high performance applications, such as optical data center interconnects, use other types of modulators, such as Mach-Zehnder (MZ) modulators. MZ modulators are typically larger, costlier and require a digital signal processor (DSP) or other methods to compensate for their sinusoidal modulation function.

There is a need for electro-absorption modulators with improved linearization and temperature compensation, particularly for applications such as high speed optical data center interconnects.

SUMMARY OF INVENTION

The present invention seeks to eliminate or mitigate one or more of the above-mentioned disadvantages of known devices and systems comprising electro-absorption modulators, or at least provide an alternative.

Aspects of the invention provide electro-photonic integrated circuits comprising an electro-absorption modulator having monolithically integrated driver and control electronics comprising fast feedback control loop circuitry for linearization and temperature compensation. The fast feedback control loop circuitry for linearization and temperature compensation comprises a first sensor for detecting a temperature of the electro-absorption modulator and generating a first feedback signal for temperature compensation of the electro-modulator and a second sensor for detecting a signal level indicative of the optical output of the electro-absorption modulator and generating a second feedback signal for linearization of the optical output of the electro-absorption modulator.

In one aspect, an electro-photonic integrated circuit comprises:
a substrate;
an electro-absorption modulator (EAM) and driver and control circuitry monolithically integrated on the substrate; the EAM having an optical input for receiving continuous wave optical input, an optical output for outputting a modulated optical output, and first and second electrical terminals for applying a bias voltage for operating the EAM;
an electrical control terminal for receiving an input analog modulation signal which is fed through the control circuitry to a drive transistor of the driver circuitry of the EAM; the control circuitry comprising:
a temperature sensor for detecting a temperature of the EAM and generating a first feedback signal dependent on the temperature of the EAM and a first control loop element for combining the first feedback signal and the input analog modulation signal to provide a temperature compensated modulation signal;
an output monitor for detecting an output level of the EAM and generating a second feedback signal dependent on the output level of the EAM and a second control loop element for combining the second feedback signal and the temperature compensated modulation signal to provide a linearized modulation signal.

In exemplary embodiments, the temperature sensor for detecting a temperature of the EAM comprises an electrical temperature sensor placed in close proximity to the electro-absorption modulator and the first control loop element for combining comprises a coupler for adding the first feedback signal, e.g. a temperature dependent offset bias, to the input analog modulation signal to provide the temperature compensated modulation signal.

In one embodiment, the output monitor comprises electrical components for detecting a photocurrent of the electro-absorption modulator and generating the second feedback signal. In another embodiment, the output monitor comprises electro-optical components comprising an optical tap, for sampling an optical output of electro-absorption modulator, and a photodetector and a transimpedance amplifier for generating the second feedback signal. For example, the second control loop element for combining the second feedback signal and the temperature compensated modulation signal comprises a differential amplifier. The temperature compensated modulation signal is input to a non-inverting input of the differential amplifier and the second feedback signal is input to an inverting input of the differential amplifier, to generate an error voltage from the difference between the two signals.

For applications such as high speed optical data center interconnects, e.g. 25G or 56G and higher, it is critical that the control loop circuitry for linearization and temperature compensation provides sufficiently fast feedback and stable operation. Operation of the control loop using discrete components is not practical for high speed operation. A small die size, in which the optical components and electrical components are monolithically integrated and the chip layout is optimized to place the optical and electrical components in close proximity, reduces the lengths of conductive interconnect tracks between components to microns or tens of microns, thereby reducing timing delays and phase delays.

For small form factor, low cost and relatively short reach applications, such as 400G data center interconnects, when the control and driving electronics and the electro-absorption modulator are integrated into a sufficiently small area, it is possible to eliminate the matched impedance strip-line drive circuit and the associated power loss. Monolithic integration of the optical modulator and the associated driver and control electronics according to embodiments disclosed herein places the components in close proximity and reduces the length of conductive interconnect tracks, e.g. from millimeters to microns. This approximately 1000:1 reduction track lengths, reduces distances that electrical signals must travel, and dramatically reduces phase and time delays between blocks of components, thus enabling fast feedback control circuitry using all electronic components, or electro-optic components, to be implemented, even at very high speeds. This fast feedback approach can linearize the overall transfer function of the modulator as well as closely monitor the temperature of the modulator and apply the appropriate temperature dependent bias voltage to keep the operating range of the modulator properly centered.

In example embodiments, an electro-absorption modulator and the monolithically integrated driver and control circuitry is implemented using III-V semiconductor materials, e.g. using an InP based material system, comprising selected binary, ternary and quaternary compounds of In, P, Ga, As and Al.

In example embodiments, for operation with a light source comprising a cw semiconductor laser operating in the 1577 nm range, the EAM comprises InP based optical components and InP HBT transistors for the fast electronic circuitry for the driver and control electronics. For monolithic integration of the EAM and driver and control electronics, for example, the electro-photonic integrated circuit comprises: an epitaxial layer structure grown on the substrate; the epitaxial layer structure comprising a first plurality of semiconductor layers formed on first and second areas of the substrate and a second plurality of semiconductor layers formed on the second area of the substrate; in the first area, the first plurality of semiconductor layers (HBT epilayers) being structured to define electronic circuitry comprising HBTs of the driver and control circuitry; in the second area, the second plurality of semiconductor layers (EAM waveguide epilayers) being structured to define at least one optical waveguide comprising an EAM waveguide (EAM waveguide epilayers) of the EAM; and interconnect metallization providing electrical interconnections between the EAM and the driver and control circuitry for operating the EAM.

To reduce parasitics, and reduce timing delays and phase delays, the driver and control circuitry are formed on the first area of the substrate adjacent to the second area of the substrate comprising the EAM, and the chip layout is arranged to optimize interconnect, e.g. to place components of the EAM and the driver and control circuitry in close proximity, wherein the lengths of electrically conductive interconnect tracks between said components are in the range of microns to tens of microns.

The epitaxial layer structure may be selected to be compatible with a single epitaxial growth process, or a multiple epitaxial growth process may be used.

For example, the first plurality of semiconductor layers (HBT layers) is separated from the second plurality of semiconductor layers (EAM waveguide layers) by a spacer. The spacer layer may comprise a plurality of layers comprising at least one etch stop, for selective removal of the second plurality of semiconductor layers (i.e. comprising the EAM waveguide epilayers) from the first area of substrate for processing of the first plurality of semiconductor layers (i.e. HBT epilayers) to define the electronic circuitry comprising HBTs of the driver and control circuitry.

The EAM and the driver and control circuitry may be monolithically integrated with a semiconductor laser to form an electro-absorption modulated laser (EML); or the EAM and the driver and control circuitry may be integrated with a hybrid semiconductor laser to form an EML assembly. The driver and control circuitry may comprise an input/output for interconnection to laser control circuitry to form a closed feedback control loop.

In another aspect, an electro-photonic integrated circuit comprises:
an electro-absorption modulator (EAM) and driver and control circuitry monolithically integrated on a substrate, wherein:
an epitaxial layer structure is provided on the substrate;
the epitaxial layer structure comprising a first plurality of semiconductor layers formed on first and second areas of the substrate and a second plurality of semiconductor layers formed on the second area of the substrate;
in the first area, the first plurality of semiconductor layers being structured to define electronic circuitry comprising heterojunction bipolar transistors (HBTs) of the driver and control circuitry;
in the second area, the second plurality of semiconductor layers being structured to define at least one optical waveguide comprising an EAM waveguide of the EAM; and
interconnect metallization providing electrical interconnections between the EAM and the driver and control circuitry for operating the EAM;
and wherein:
the EAM has first and second electrical terminals for applying a bias voltage for operating the EAM and an electrical control terminal for receiving an input analog modulation signal which is fed through the control circuitry to a drive transistor of driver circuitry of the EAM;
and the control circuitry comprising:
a temperature sensor for detecting a temperature of the EAM and generating a first feedback signal dependent on the temperature of the EAM and a first control loop element configured to combine the first feedback signal and the input analog modulation signal to provide a temperature compensated modulation signal; and an output monitor for detecting an output level of the EAM and generating a second feedback signal dependent on the output level of the EAM and a second control loop element configured to combine the second feedback signal and the temperature compensated modulation signal and provide a linearized modulation signal.

The output monitor comprises one of: electrical components for detecting a photocurrent of the electro-absorption modulator and generating the second feedback signal; and electro-optical components comprising an optical tap, for sampling an optical output of electro-absorption modulator, a photodetector and a transimpedance amplifier for generating the second feedback signal. The interconnect metal interconnect metallization comprises electrically conductive tracks directly interconnecting the EAM driver and control circuitry and the EAM, said tracks having lengths in the range of microns to tens of microns, thereby reducing timing delays and phase delays.

Yet another aspect of the invention provides a method of fabricating an electro-photonic integrated circuit comprising an EAM and monolithically integrated driver and control circuitry comprising: providing a substrate; growing a blanket epitaxial layer structure on first and second areas of the substrate, the first area being designated for electronic circuitry comprising driver and control circuitry and the second area being designated for optical components comprising an EAM and; the blanket epitaxial layer structure comprising: a first plurality of semiconductor layers for fabrication of the electronic circuitry; at least one spacer layer comprising a selective etch stop; and a second plurality of semiconductor layers for fabrication of at least one optical waveguide comprising an EAM waveguide; protecting the second area and selectively removing from the first area the second plurality of semiconductor layers; processing the first plurality of semiconductor layers to define the electronic circuitry comprising the driver and control circuitry in the first area; protecting the first area comprising the electronic circuitry; processing the second plurality of semiconductor layers comprising: patterning layers of the EAM waveguide to provide the EAM having an optical input and an optical output; and providing electrical interconnections comprising interconnect tracks between the EAM and the driver and control circuitry, for operating the EAM.

The device structures and methods of example embodiments, other embodiments, and modifications thereof, may comprise any feasible combinations of features disclosed in the detailed description and drawings.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF THE DRAWINGS

FIG. 3A shows a schematic plan view of an electro-photonic circuit of a third embodiment, comprising an EAM with monolithically integrated EAM driver and control circuitry;

FIG. 3B shows a schematic cross-sectional view of an epitaxial layer structure comprising a plurality of semiconductor layers for fabrication of the EAM and monolithically integrated EAM driver and control circuitry of the third embodiment;

FIG. 3C shows a schematic cross-sectional view through plane C-C of FIG. 3A;

DETAILED DESCRIPTION

Figure 1:
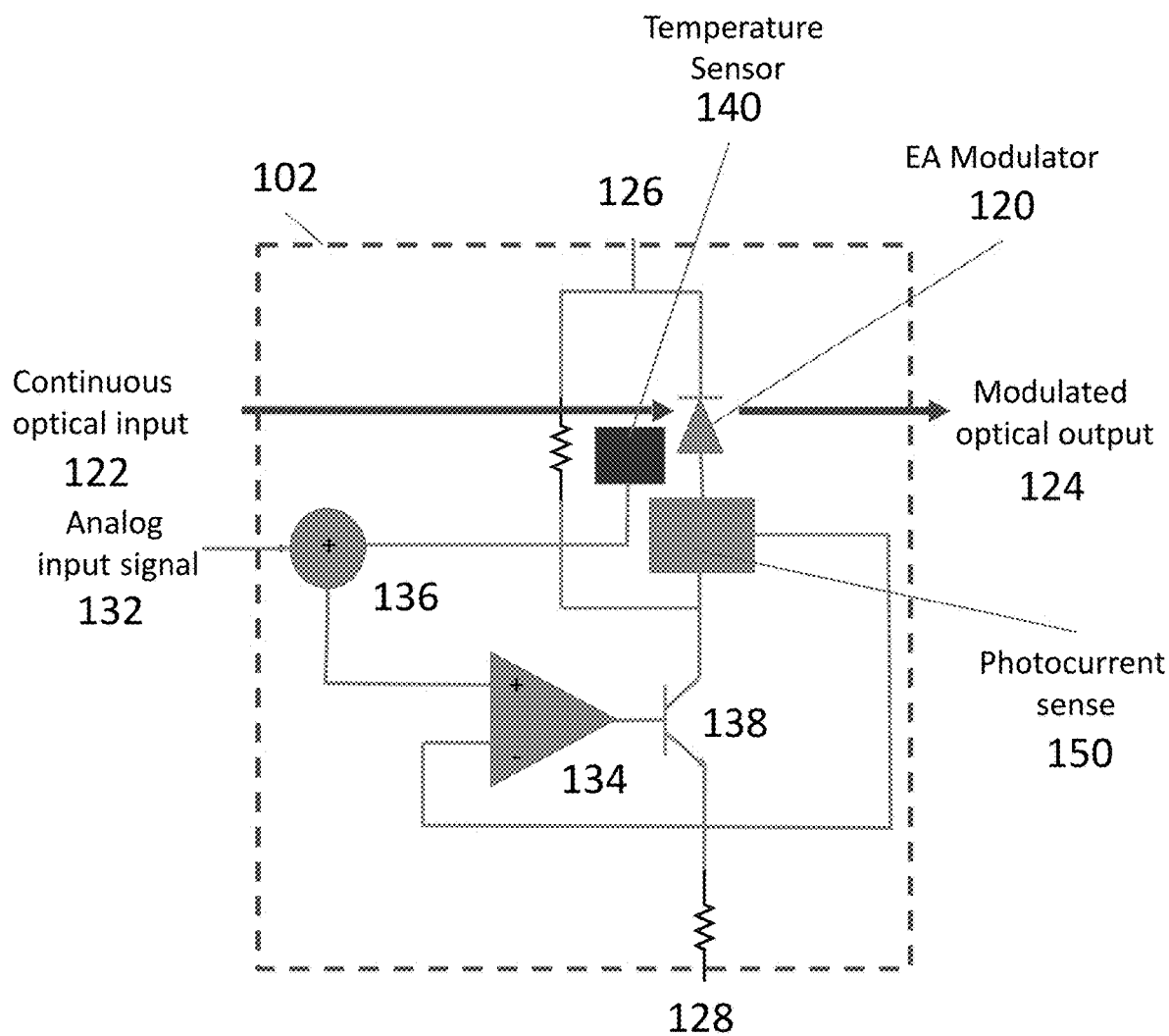
FIG. 1 shows a schematic diagram of an electro-photonic circuit of a first embodiment, comprising an electro-absorption modulator (EAM) having monolithically integrated driver and control circuitry for linearization and temperature compensation.

An electro-photonic integrated circuit 100 comprising an electro-absorption modulator 120 and monolithically integrated fast feedback control loop circuitry according to a first embodiment, is shown in FIG. 1. Elements of the electro-photonic integrated circuit 100 are monolithically fabricated on a device area 102 of the substrate, and comprise the electro-absorption modulator 120 and integrated driver and control circuitry elements. The electro-absorption modulator 120 has an optical input 122 for receiving continuous wave (CW) optical input and an optical output 124 for outputting a modulated optical output. For example, the CW optical input may be provided by a discrete or integrated laser diode (not illustrated) that is coupled to the electro-absorption modulator via an optical waveguide and/or a spot size converter (SSC). The optical output 124 may also comprise a SSC for coupling to other optical components. Electrical terminals 126 and 128 of the electro-optical modulator are provided for applying a reverse DC bias for operation of the electro-absorption modulator 120. An input modulation signal, i.e. an analog electrical signal, provided at control input 132, and fed through elements of the control circuitry to the control terminal of drive transistor 138 of the driver circuitry of the electro-absorption modulator 120 for modulation of the optical output signal. The integrated driver and control circuitry forms a fast feedback control loop, comprising a first sense means with a first control loop element, for temperature compensation, and a second sense means with a second control loop element, for linearization of the electro-absorption modulator.

The first sense means operates to detect a temperature of the electro-absorption modulator and generate a first feedback signal dependent on the temperature of the electro-absorption modulator, and a first control loop element operates to combine the first feedback signal and the input analog modulation signal to provide a temperature compensated modulation signal. The first sense means comprises an electrical sensor 140 for detecting a temperature of the electro-absorption modulator and generating a temperature dependent bias voltage. The temperature dependent bias voltage is fed to control circuit element 136 where it is combined with the input modulation signal to generate a temperature compensated modulation signal. The temperature sensor generates a DC bias which is dependent on the temperature of the modulator, and which is applied to adjust the analog input signal to compensate for temperature changes.

Preferably, the electrical temperature sensor is placed in close proximity to the electro-absorption modulator and the first control loop element for combining comprises a coupler 136 for adding the first feedback signal, e.g. a temperature dependent bias voltage, to the input analog modulation signal to provide a temperature compensated modulation signal.

The second sense means comprises electrical circuitry 150 for detecting the output level of the electro-absorption modulator, e.g. an electrical photocurrent sense element for detecting the absorbed photocurrent of the electro-absorption modulator and generating the second feedback signal, dependent on the output level of the electro-absorption modulator. The second control loop element comprises a differential amplifier 134 for combining the second feedback signal and the temperature compensated modulation signal to provide a linearized modulation signal. That is, the temperature compensated modulation signal is input to a non-inverting input of the differential amplifier and the second feedback signal is input to an inverting input of the differential amplifier, to generate an error voltage from the difference between the two signals. Thus, the fast feedback control circuitry measures the output optical signal and compares that to the electrical input signal driving the block. The error voltage is generated from the difference between the two signals and is fed to the driver.

Figure 2:
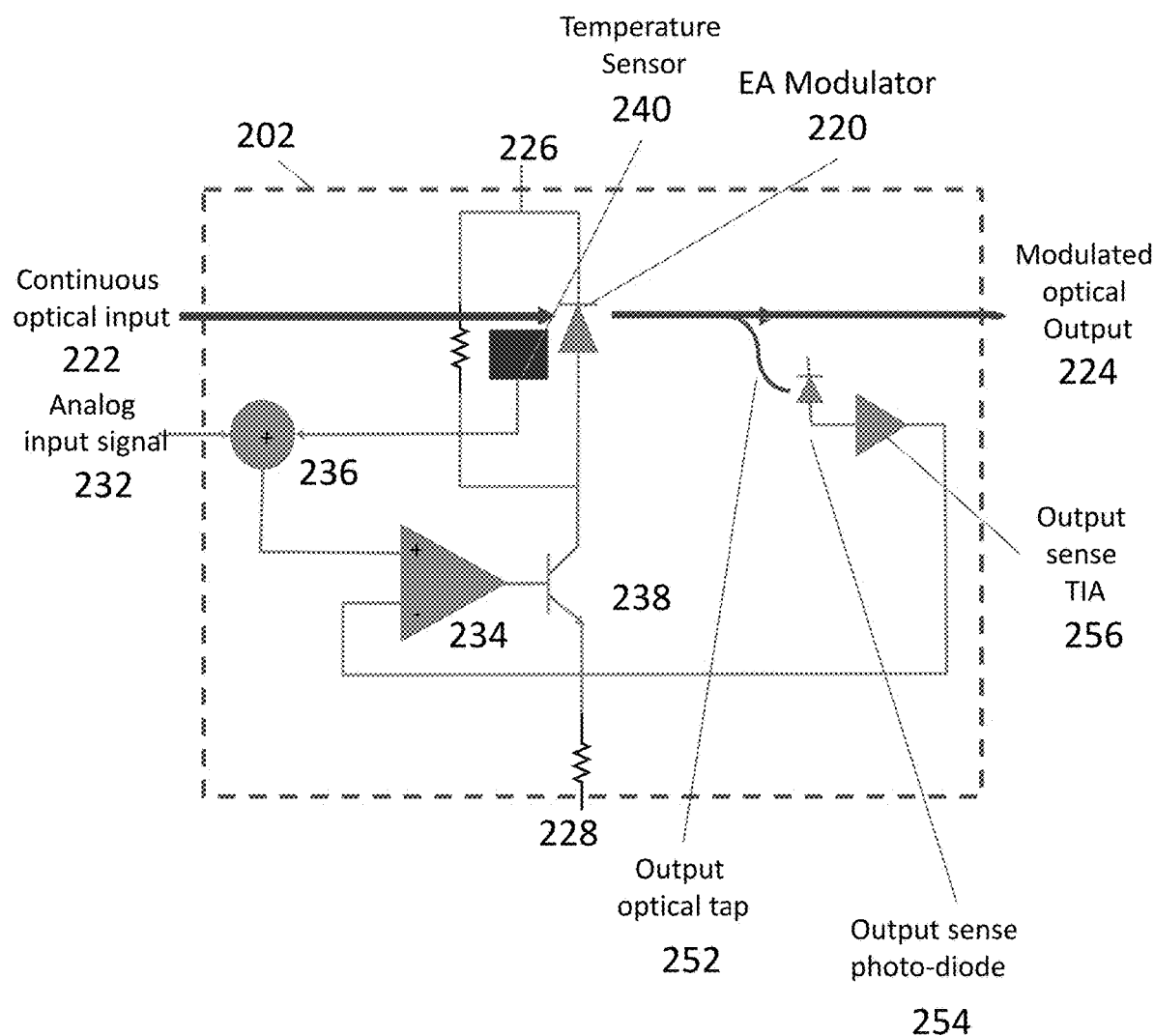
FIG. 2 shows a schematic diagram of an electro-photonic circuit of a second embodiment, comprising an EAM having monolithically integrated driver and control circuitry for linearization and temperature compensation.

An electro-optic integrated circuit 200 comprising an electro-optic modulator 220 having monolithically integrated driver and control electronics comprising a fast feedback circuit for linearization and temperature compensation, according to a second embodiment, is shown in FIG. 2. Many elements of the circuit 200 are similar to those of the circuit 100 of the first embodiment and are labelled with the same reference numerals incremented by 100. Temperature sensor 240 provides for temperature compensation as described for circuit 100 shown in FIG. 1. The fast feedback circuitry shown in FIG. 2 differs from that shown in FIG. 1 in that it comprises electro-optic circuitry for measuring the output optical signal level. That is, the fast feedback circuitry comprises optical tap 252, output sense photo-diode 254 and output sense transimpedance amplifier (TIA) 256 to measure the output optical signal and provide the second feedback signal to the differential amplifier 234. As in the electro-absorption modulator of the first embodiment, the temperature compensated modulation signal is input to a non-inverting input of the differential amplifier and the second feedback signal is input to an inverting input of the differential amplifier, to generate an error voltage from the difference between the two signals which is fed to the driver.

The two embodiments described above differ in the way the feedback measurement of output light is done. The first embodiment shown in FIG. 1 uses the absorbed photocurrent to measure the output level of the electro-absorption modulator. The second embodiment shown in FIG. 2 taps off a small amount of the output optical signal, and detects it using a high-speed photo detector and a TIA. In each case, the feedback circuit measures the output optical signal and compares that to the electrical input signal driving the block. The error voltage is generated from the difference between the two signals and is fed to the driver. In both implementations, a temperature sensor is placed in close proximity to the modulator. In this way a DC bias is generated that sets the bias dependent on the temperature of the modulator.

For small form factor, low cost and relatively short reach applications, such as 400G data center interconnects, when the driving electronics and the EAM are integrated into a sufficiently small device area, it is possible to eliminate the matched impedance strip-line drive circuit and the associated power loss. Monolithic integration of the optical modulator and the associated driver and control electronics places the components in closer proximity and significantly reduces the lengths of conductive interconnect tracks, e.g. from millimeters to microns. This approximate 1000:1 reduction in distances that electrical signals must travel, dramatically reduces phase and time delays between blocks thus enabling a fast feedback circuit of either electronic or electro-optic form to be implemented, even at very high speeds. The feedback approach can linearize the overall transfer function of the modulator as well as closely monitor the temperature of the modulator and apply the appropriate temperature dependent bias voltage to keep the operating range of the modulator properly centered.

By way of example, to illustrate how an EAM and its driver and control circuitry can be monolithically integrated in practice, i.e. to place optical and electronic components in close proximity to reduce interconnect lengths, FIG. 3A shows a schematic plan view of an EAM with a monolithically integrated EAM driver comprising control circuitry of a third embodiment. The electronic circuitry comprising the EAM driver and control circuitry is fabricated on a first area (Area 1) of the substrate. The EAM is fabricated on a second area (Area 2) of the substrate. As illustrated schematically, to monitor the optical output of the EAM, the EAM driver and control circuitry comprises at least one of a) a photocurrent sense for indirectly monitoring the optical output of the EAM, and b) an optical tap and a photodiode for directly monitoring the optical output of the EAM, or c) a combination of optical and electronic components for direct and indirect monitoring of the EAM output.

In the embodiment shown in FIGS. 3A, 3B and 3C, the EAM and the EAM driver and control circuitry are fabricated using an InP based material system and a single epitaxial growth on a semi-insulating (SI) InP substrate, to form an epitaxial layer stack as illustrated schematically in FIG. 3B. A first plurality of semiconductor layers of the epitaxial layer stack are provided for fabrication of the electronic circuitry comprising InP Hetero junction Bipolar Transistors (InP HBT), which are labelled "InP HBT epilayers". A second plurality of semiconductor layers of the epitaxial layer stack comprise layers that are structured to provide a waveguide for the EAM, which are labelled "EAM waveguide layers". The first and second plurality of semiconductor layers are separated by a spacer, comprising one or more layers, which includes an etch stop. The first area of the substrate is processed to remove the EAM waveguide epilayers to expose the InP HBT epilayers, for fabrication of the electronic circuitry for the EAM driver and control circuitry comprising high-speed InP HBTs. The second area comprising the EAM waveguide epilayers is processed to form the EAM and any associated optical components, e.g., if required, any optical monitoring components such as an optical tap and photodiode detector, and if required, e.g. a passive output waveguide, and a spot size converter. An example fabrication process is described in more detail in the above-referenced related patent application U.S. 62/936, 629. The HBT epilayer stack for the high-speed electronics is grown on the SI substrate. If the high-speed electronics were grown on top of the optical components, the conductivity of the layers forming the optical waveguides, e.g. the EAM waveguide, would reduce the speed of operation of the HBT transistors. Thus, a second epi-layer stack for the optical waveguides is grown above the HBT epilayers for the electronics, and a spacer, or stitching layers, which include an etch stop, separates the HBT epilayer stack and the overlying epilayer stack for the optical waveguides.

FIG. 3C shows a schematic cross-sectional view through plane C-C of FIG. 3A. FIG. 3C illustrates schematically how the plurality of semiconductor layers are structured for fabrication of the EAM and monolithically integrated EAM driver of this embodiment, in which the EAM driver and control circuitry is placed laterally to the side the EAM waveguide, and in close proximity to the EAM waveguide, to reduce the lengths of electrical interconnects between the EAM and its driver and control circuitry. The device layout (i.e. device and interconnect topology) of optical and electrical components of areas 1 and 2 and their electrical interconnections is arranged to optimize the electrical interconnect for high speed switching, using short lengths of interconnects, e.g. in the range of microns to tens of microns, to reduce timing delays and phase delays. Monolithic integration of the EAM and its driver and control electronics eliminates hybrid integration parasitics introduced by integration of hybrid components, and avoids the need for impedance matching for wirebonding.

Figure 4:
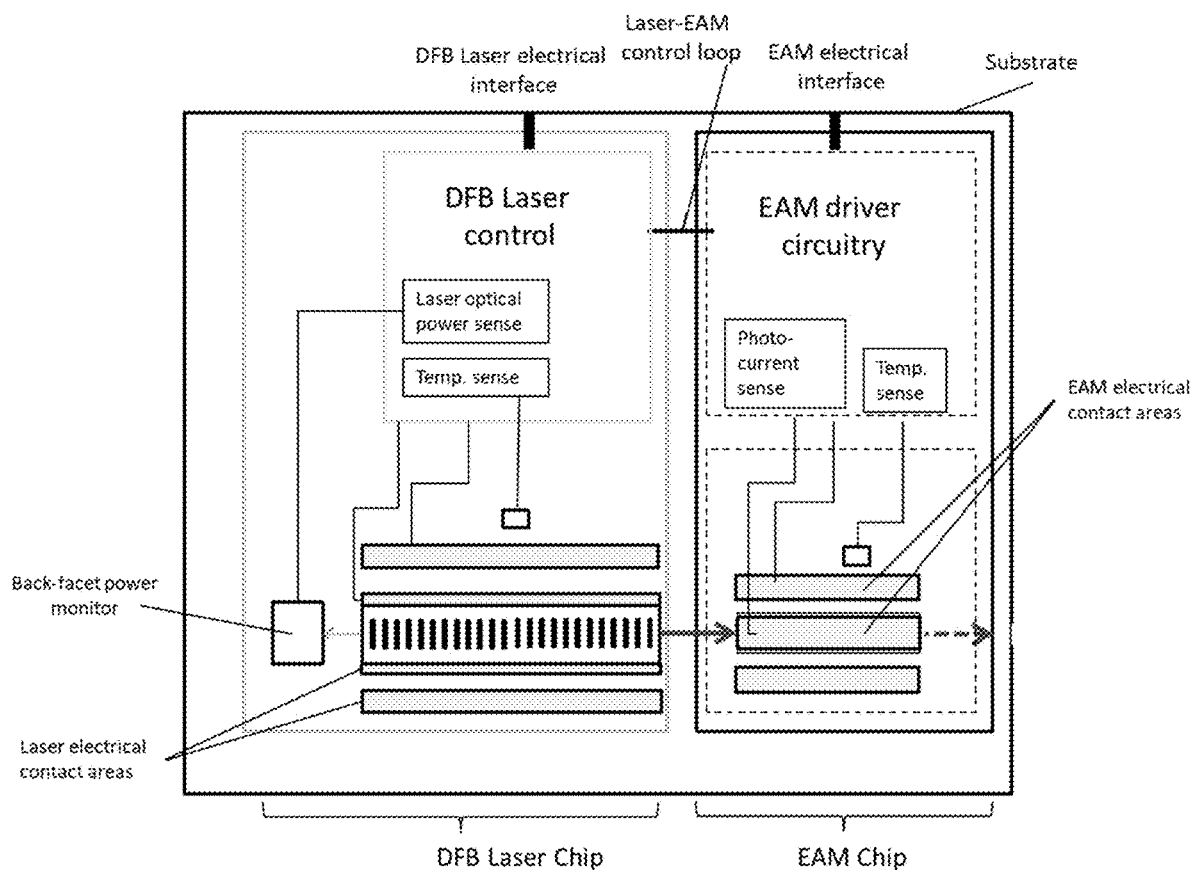
FIG. 4 shows a schematic plan view of an electro-absorption modulated laser (EML) wherein the EAM comprises integrated EAM driver and control circuitry of a fourth embodiment.

FIG. 4 shows a schematic plan view of an electro-absorption modulated laser (EML) comprising an EAM and monolithically integrated EAM driver and control circuitry of a fourth embodiment. In this embodiment, the EAM chip comprising the integrated EAM and its driver and control circuitry comprises a photo current sense for monitoring the EAM output, e.g. using a driver and control circuit as illustrated schematically in FIG. 1. The laser, e.g. a DFB semiconductor laser with a surface etched grating, is operated in CW mode and may comprise discrete or integrated laser control circuitry. The laser may include a photodetector for power monitoring, e.g. a photodiode for back-facet power monitoring (as illustrated schematically). Alternatively, it may include some sort of front-facet optical tap and a photodetector for front-facet power monitoring. In this example embodiment, the EAM driver and control circuitry also provides for a connection (labelled laser-EAM control loop) between the EAM driver and control circuitry and the laser control circuitry. This connection enables a closed-loop feedback between the laser and the EAM for improved performance, e.g. to adjust for changes in laser output due to aging, or temperature fluctuations, et al. This type of closed-loop feedback between the CW laser source and the EAM and its fast driver and control circuitry, to provide linearization and temperature control, assists in improving performance for advance modulation techniques, and may be particularly beneficial for monolithically integrated electro-absorption modulated lasers (EML), as described in more detail in U.S. 62/936,629 referenced above.

Figure 5:
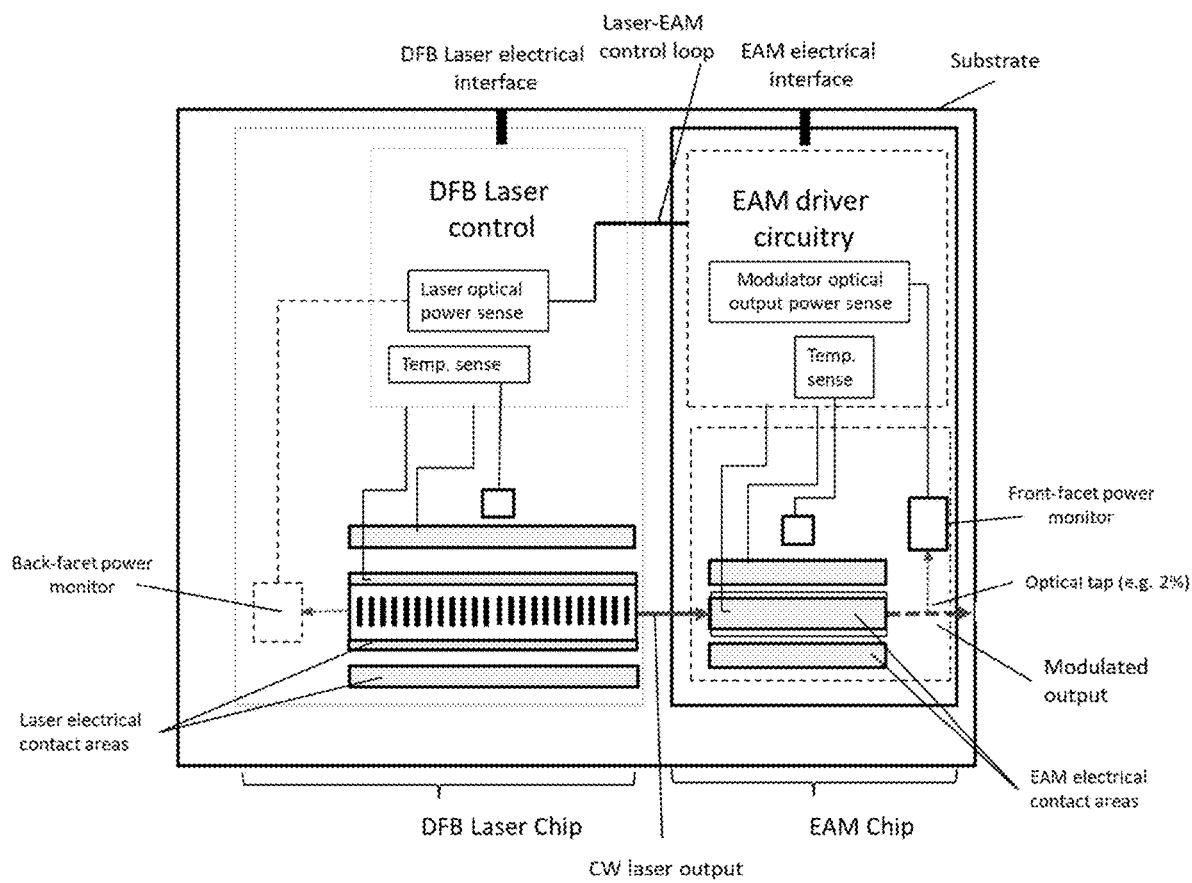
FIG. 5 shows a schematic plan view of an electro-absorption modulated laser (EML) wherein the EAM comprises integrated EAM driver and control circuitry of a fifth embodiment.

FIG. 5 shows a schematic plan view of an integrated electro-absorption modulated laser (EML) comprising an EAM and monolithically integrated EAM driver and control circuitry of a fifth embodiment, wherein the EAM and its driver and control circuitry comprises an optical tap and a front-facet optical output power monitor for the EAM. e.g. using a driver and control circuit as illustrated schematically in FIG. 2. The laser may include a back-facet or front-facet output power monitor. However, these may be omitted, or supplemented by front-facet power monitoring of the optical output of the EAM modulator. For example, as illustrated schematically in FIG. 5, a direct interconnection of the EAM driver and control circuitry with the laser control circuitry provides for a closed feedback control loop, i.e. the link labelled laser-EAM control loop.

As illustrated in the example embodiment shown schematically in FIG. 3A, the EAM and its driver and control circuitry may include an EAM output monitor comprising both a photocurrent sensor and some form of optical output monitor, such as a front-facet optical tap and photodiode detector, as illustrated schematically. Any suitable form of optical tap and photodiode detector may be used for monitoring of the EAM optical output, and for monitoring the optical output of the laser.

Device structures and methods of fabrication of some example embodiments described herein relate to monolithic integration of an EAM and its driver and control circuitry to enable high performance modulation. In variants of these embodiments described above, features of one embodiment may be combined, as feasible, with features of one or more other embodiments.

Although FIGS. 4 and 5 show example device structures with hybrid DFB laser chip and EAM chip, which could be butt-coupled by any appropriate known technique, it is envisaged that in alternative embodiments, the laser and EAM, and electronics comprising at least the EAM driver and control circuitry, and optionally, the laser control circuitry may be monolithically integrated using vertical integration techniques, e.g. as described in U.S. 62/936,629. U.S. 62/936,629 provides more details of device structures and fabrication processes for monolithic integration of a laser and EAM, and in particular for vertical integration of a DFB laser and an EAM and driver and control circuitry, optionally with other active and passive electro-photonic components, e.g. an output waveguide and a spot-size converter. For example, a DFB laser, an EAM, and EAM driver and control circuitry may be monolithically integrated to form an electro-absorption modulated laser (EML).

Monolithic integration of an EAM and EAM driver and control circuitry reduces the scale of interconnect to microns and this fact, combined with very high-speed InP transistors, means that a drive circuit can be implemented that uses feedback to linearize the electro-optical transfer function of the modulator within a limited range of input electrical signals and input optical signals. When operating within this range, the input Continuous Wave (CW) light signal can be linearly modulated allowing advanced modulation schemes, such as QPSK (Quadrature Phase Shift Keying), PAM-4 (4-level Pulse Amplitude Modulation) or even QAM (Quadrature Amplitude Modulation), to be applied to the optical signal. For limited reach applications, such as data center interconnect where the path losses and impairments due to dispersion are limited, complex analog modulation of the light signal can be implemented effectively within a limited dynamic range, while providing good error rate performance across the link. This allows a significant reduction in complexity, cost and power of the link by using simpler building blocks such as an EAM and its associated integrated analog electronics, i.e. comprising the driver and control circuitry, to replace more complex assemblies of Mach-Zehnder modulators, strip line packaging and DSPs to implement the transmitter.

As discussed in U.S. 62/936,629, when components are vertically integrated, e.g. using an epitaxial layer stack comprising a first plurality of semiconductor layers for the HBT epilayers, and a second plurality of semiconductor layer for the EAM optical waveguide, fabricated by either single epitaxial growth, or multiple epitaxial growth, the HBT epilayers and the optical waveguide epilayers may be independently optimized. By providing appropriate spacer or separation layers, e.g. comprising etch stops, device areas comprising HBT layers for electronic circuitry and device areas comprising optical waveguide layers for optical components can be separately processed.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. An electro-photonic integrated circuit comprising:
   a substrate;
   an electro-absorption modulator (EAM) and driver and control circuitry monolithically integrated on the substrate;
   the EAM having an optical input for receiving continuous wave optical input, an optical output for outputting a modulated optical output, and first and second electrical terminals for applying a bias voltage for operating the EAM;
   an electrical control terminal for receiving an input analog modulation signal which is fed through the control circuitry to a drive transistor of the driver circuitry of the EAM;
   the control circuitry comprising:
   a temperature sensor for detecting a temperature of the EAM and generating a first feedback signal dependent on the temperature of the EAM and a first control loop element for combining the first feedback signal and the input analog modulation signal to provide a temperature compensated modulation signal; and
   an output monitor for detecting an output level of the EAM and generating a second feedback signal dependent on the output level of the EAM and a second control loop element for combining the second feedback signal and the temperature compensated modulation signal to provide a linearized modulation signal.

2. The electro-photonic integrated circuit of claim 1, wherein the temperature sensor for detecting a temperature of the electro-absorption modulator is an electrical temperature sensor placed in close proximity to the EAM and the first control loop element for combining comprises a coupler for adding the first feedback signal, to the input analog modulation signal to provide a temperature compensated modulation signal.

3. The electro-photonic integrated circuit of claim 2, wherein the first feedback signal comprises a temperature dependent offset bias.

4. The electro-photonic integrated circuit of claim 1, wherein the output monitor comprises electrical components for detecting a photocurrent of the EAM and generating the second feedback signal.

5. The electro-photonic integrated circuit of claim 1, wherein the output monitor comprises electro-optical components comprising an optical tap, for sampling an optical output of the EAM, a photodetector and a transimpedance amplifier to generate the second feedback signal.

6. The electro-photonic integrated circuit of claim 1, wherein the second control loop element for combining the second feedback signal and the temperature compensated modulation signal comprises a differential amplifier, wherein the temperature compensated modulation signal is input to a non-inverting input of the differential amplifier and the second feedback signal is input to an inverting input of the differential amplifier, to generate an error voltage from the difference between the two signals, which is fed to the driver.

7. The electro-photonic integrated circuit of claim 1, wherein components of the EAM and the driver and control circuitry are placed in close proximity and interconnnected by electrically conductive interconnect tracks, wherein lengths of the electrically conductive interconnect tracks between said components are in a range of microns.

8. The electro-photonic integrated circuit of claim 1, wherein the EAM is formed on a first area of the substrate and the driver and control circuitry are formed on a second area of the substrate adjacent to the EAM, a chip layout being arranged to optimize interconnect and to place components of the EAM and the driver and control circuitry in close proximity, wherein lengths of electrically conductive interconnect tracks interconnecting said components of the EAM and the driver and control circuitry are in a range of microns to tens of microns, to reduce timing delays and phase delays.

9. The electro-photonic integrated circuit of claim 1, wherein the EAM and driver and control circuitry are implemented using III-V semiconductor materials.

10. The electro-photonic integrated circuit of claim 1, wherein the EAM and driver and control circuitry comprise an Indium Phosphide (InP) based materials system comprising selected binary, ternary and quaternary compounds of In, P, Ga, As and Al.

11. The electro-photonic integrated circuit of claim 1, comprising:
    an epitaxial layer structure grown on the substrate;
    the epitaxial layer structure comprising a first plurality of semiconductor layers formed on first and second areas of the substrate and a second plurality of semiconductor layers formed on the second area of the substrate;
    in the first area, the first plurality of semiconductor layers being structured to define electronic circuitry comprising heterojunction bipolar transistors (HBTs) of the driver and control circuitry;
    in the second area, the second plurality of semiconductor layers being structured to define at least one optical waveguide comprising an EAM waveguide of the EAM; and
    interconnect metallization providing electrical interconnections between the EAM and the driver and control circuitry for operating the EAM.

12. The electro-photonic integrated circuit of claim 11, wherein the driver and control circuitry are formed on the first area of the substrate adjacent the second area of the substrate comprising the EAM, to place components of the EAM and the driver and control circuitry in close proximity, wherein lengths of electrically conductive interconnect tracks interconnecting said components of the EAM and driver and control circuitry are in a range of microns to tens of microns.

13. The electro-photonic integrated circuit of claim 11, wherein the driver and control circuitry are formed on the first area of the substrate adjacent the second area of the substrate comprising the EAM, a chip layout being arranged to optimize interconnect and to place components of the EAM and the driver and control circuitry in close proximity, wherein lengths of electrically conductive interconnect tracks interconnecting said components of the EAM and the driver and control circuitry are in a range of microns to tens of microns, thereby reducing timing delays and phase delays.

14. The electro-photonic integrated circuit of claim 11, wherein
the epitaxial layer structure is compatible with a single epitaxial growth process; or
the epitaxial layer structure is compatible with a multiple epitaxial growth process.

15. The electro-photonic integrated circuit of claim 14, wherein
in the second area, the first plurality of semiconductor layers (HBT epilayers) are separated from the second plurality of semiconductor layers (EAM waveguide epilayers) by a spacer.

16. The electro-photonic integrated circuit of claim 15, wherein the spacer comprises a plurality of layers comprising at least one etch stop, to enable selective removal of the EAM waveguide epilayers from the first area of substrate for processing of the HBT epilayers to define the electronic circuitry comprising HBTs of the driver and control circuitry.

17. The electro-photonic integrated circuit of claim 1, wherein:
the EAM and the driver and control circuitry are integrated with a semiconductor laser to form an electro-absorption modulated laser (EML).

18. The electro-photonic integrated circuit of claim 17, wherein the driver and control circuitry comprises an input/output for interconnection to laser control circuitry to provide a closed feedback control loop between the semiconductor laser and EAM.

19. An electro-photonic integrated circuit comprising:
an electro-absorption modulator (EAM) and driver and control circuitry monolithically integrated on a substrate, wherein:
an epitaxial layer structure is provided on the substrate;
the epitaxial layer structure comprising a first plurality of semiconductor layers formed on first and second areas of the substrate and a second plurality of semiconductor layers formed on the second area of the substrate;
in the first area, the first plurality of semiconductor layers being structured to define electronic circuitry comprising heterojunction bipolar transistors (HBTs) of the driver and control circuitry;
in the second area, the second plurality of semiconductor layers being structured to define at least one optical waveguide comprising an EAM waveguide of the EAM; and
interconnect metallization providing electrical interconnections between the EAM and the driver and control circuitry for operating the EAM; wherein:
the EAM has first and second electrical terminals for applying a bias voltage for operating the EAM and an electrical control terminal for receiving an input analog modulation signal which is fed through the control circuitry to a drive transistor of driver circuitry of the EAM; and
the control circuitry comprising:
a temperature sensor for detecting a temperature of the EAM and generating a first feedback signal dependent on the temperature of the EAM and a first control loop element configured to combine the first feedback signal and the input analog modulation signal to provide a temperature compensated modulation signal; and
an output monitor for detecting an output level of the EAM and generating a second feedback signal dependent on the output level of the EAM and a second control loop element configured to combine the second feedback signal and the temperature compensated modulation signal and provide a linearized modulation signal.

20. The electro-photonic integrated circuit of claim 19, wherein said interconnect metallization comprises electrically conductive tracks directly interconnecting the EAM and the driver and control circuitry, said electrically conductive tracks having lengths in a range of microns to tens of microns, to reduce timing delays and phase delays.

21. The electro-photonic integrated circuit of claim 19, wherein the output monitor comprises one of:
electrical components for detecting a photocurrent of the electro-absorption modulator and generating the second feedback signal; and
electro-optical components comprising an optical tap, for sampling an optical output of electro-absorption modulator, a photodetector and a transimpedance amplifier for generating the second feedback signal.

* * * * *

UNITED STATES PATENT AND TRADEMARK OFFICE
CERTIFICATE OF CORRECTION

PATENT NO. : 10,673,532 B2
APPLICATION NO. : 16/708887
DATED : June 2, 2020
INVENTOR(S) : Gudmundur A. Hjartarson and William A. Hagley It is certified that error appears in the above-identified patent and that said Letters Patent is hereby corrected as shown below:

In the Claims

Column 12, Line 6: "interconnnected" should read --interconnected--

Column 12, Line 9: "between said components are in a range of microns" should read --between said components are in a range of microns to tens of microns--

Signed and Sealed this
Twentieth Day of September, 2022

Katherine Kelly Vidal
*Director of the United States Patent and Trademark Office*